US008504803B2

(12) United States Patent
Shukla

(10) Patent No.: US 8,504,803 B2
(45) Date of Patent: Aug. 6, 2013

(54) SYSTEM AND METHOD FOR CREATING AND EXECUTING PORTABLE SOFTWARE

(75) Inventor: Mihir Shukla, San Jose, CA (US)

(73) Assignee: Tethys Solutions LLC, San Jose, CA (US)

( * ) Notice: Subject to any disclaimer, the term of this patent is extended or adjusted under 35 U.S.C. 154(b) by 420 days.

(21) Appl. No.: 12/787,469

(22) Filed: May 26, 2010

(65) Prior Publication Data

US 2011/0296528 A1 Dec. 1, 2011

(51) Int. Cl.
*G06F 1/00* (2006.01)
*G06F 9/00* (2006.01)
*G06F 7/00* (2006.01)
*G06F 17/30* (2006.01)

(52) U.S. Cl.
USPC ............................ 712/216; 707/761; 707/718

(58) Field of Classification Search
USPC .......................................................... 712/216
See application file for complete search history.

(56) References Cited

U.S. PATENT DOCUMENTS

| 6,427,234 | B1 * | 7/2002  | Chambers et al. ............ 717/140 |
| 6,640,244 | B1 * | 10/2003 | Bowman-Amuah .......... 709/207 |
| 7,091,898 | B2 * | 8/2006  | Arling et al. .................... 341/176 |
| 7,398,469 | B2 * | 7/2008  | Kisamore et al. ............. 715/704 |
| 7,441,007 | B1 * | 10/2008 | Kirkpatrick et al. .......... 709/213 |
| 7,765,525 | B1 * | 7/2010  | Davidson et al. ............. 717/124 |
| 7,805,710 | B2 * | 9/2010  | North ............................. 717/136 |
| 8,095,910 | B2 * | 1/2012  | Nathan et al. ................. 717/110 |
| 2003/0101245 | A1 * | 5/2003 | Srinivasan et al. ............ 709/221 |
| 2005/0204343 | A1 * | 9/2005 | Kisamore et al. ............. 717/124 |
| 2006/0095276 | A1 * | 5/2006 | Axelrod et al. ..................... 705/1 |
| 2006/0150188 | A1 * | 7/2006 | Roman et al. ................. 718/104 |
| 2008/0005086 | A1 * | 1/2008 | Moore ............................... 707/3 |
| 2008/0209392 | A1 * | 8/2008 | Able et al. ..................... 717/105 |
| 2008/0222454 | A1 * | 9/2008 | Kelso .............................. 714/38 |
| 2009/0172814 | A1 * | 7/2009 | Khosravi et al. ................ 726/23 |
| 2009/0199160 | A1 * | 8/2009 | Vaitheeswaran et al. ..... 717/124 |

OTHER PUBLICATIONS

B. P. Kasper "Remote: A Means of Remotely Controlling and Storing Data from a HAL Quadrupole Gas Analyzer Using an IBM-PC Compatible Computer", Nov. 15, 1995, Space and Environment Technology Center.*

* cited by examiner

*Primary Examiner* — Polina Peach
(74) *Attorney, Agent, or Firm* — Joseph R. Carvalko

(57) ABSTRACT

This invention generally relates to a process, system and computer code for creating a portable unit on a first computer to be executed on remote computers including creating an execution file having one or more tasks for deployment, said tasks having command line arguments executable as variables by the remote computer, assembled into a single execution file, validating the tasks and organizing nested tasks, said organizing step including collecting nested task information for each task and accounting for all dependencies to insure that files, tasks, and environments for running on one or more remote computers are present in the portable unit, said step of creating an execution file further including, reading the task file, scanning for event dependencies and embedding files and links needed for remote execution of the execution file, storing the dependencies in a dependency file, scanning for security, verifying the task file for proper formatting.

6 Claims, 12 Drawing Sheets

SYSTEM AND METHOD FOR CREATING AND EXECUTING PORTABLE SOFTWARE

FIELD OF THE INVENTION

The present invention relates to information technology software process automation that facilitates in creating programs on a local computer that are executed on a remote computer.

BACKGROUND OF THE INVENTION

End users of Web task, legacy applications or Windows (Windows is a registered trade mark of Microsoft Corporation, Redmond Wash.) based operating systems create few automated processes, that is a series of steps that a user desires to execute on a computer (often at pre-defined time or with a click of a button or a mouse). These software processes could be of any type and for any purpose, e.g., business, IT, or requirements to validate software behavior, etc. In some instances, the user desires to create a task, assign properties to the task and to run the task on a local or a remote computer. Prior art technologies require a user to install a resident application or operating system modification to software on each remote computer it desires to run such a process, which is often found to be time consuming, expensive and impractical for a large number of users.

Automation Anywhere found at www.automationanywhere.com fulfils a need to create software processes locally and run on the local machine or at remote locations. Such activities are motivated for example by requirements to test large numbers of remote sites following implementation of a change in existing software, routinely monitor a remote computer from a central location, whereby the remote location on a scheduled basis runs certain software jobs and reports back to the central location, remotely generating reports and feeding them back to the central location and performing repetitive tasks such as scanning email messages for specific content. Such applications may even extend to applications for entering data into a variety of systems such as inventory or health care systems, checking inventory and reordering, reminding individuals of their upcoming appointments, installing new operating systems via patch on remote computers, monitoring data centers, or underperforming hardware, automating a QA process. For example QA software specialists often discover problems with software, but the developers subsequently cannot reproduce the problem in their computing environments. Although current technology can create the failed test case and export it as an executable the bug attached, this technology is found lacking for more complex routines that may require loop nesting and the provision of variable fields in commands that are either unknown or not established until run time. Therefore a major shortcoming of software process created on one computer and for purposes of running it on another computer is the lack of features that allow simple usability and reliable portability. Helpful in establishing a quick, reliable and low cost portability system that satisfactory drops and drags tasks coupled with portability to furnish solutions to remote execution of locally created processes is desirable, however a constant need arises to improve on the usability of such systems.

SUMMARY OF THE INVENTION

One embodiment of the invention is a computer method for creating a portable unit on a first computer to be executed on one or more remote computers including the steps of: creating an execution file having one or more tasks for deployment, said tasks having command line arguments executable as variables by the remote computers, assembled into a single execution file, validating the tasks and organizing nested tasks, said organizing step including collecting nested task information for each task and accounting for all dependencies to insure that files, tasks, and environments for running on one or more remote computers are present in the portable unit, said step of creating an execution file further including, reading the task file, scanning for event dependencies and embedding files and links needed for remote execution of the execution file, storing the dependencies in a dependency file, scanning for security, and verifying the task file for proper formatting.

Another embodiment of the invention is a computer software embodied on a computer readable medium for creating a portable unit on a first computer to be executed on one or more remote computers including code for: creating an execution file having one or more tasks for deployment, said tasks having command line arguments executable as variables by the remote computers, assembled into a single execution file, validating the tasks and organizing nested tasks, said organizing including collecting nested task information for each task and accounting for all dependencies to insure that files, tasks, and environments for running on one or more remote computers are present in the portable unit, creating an execution file further including, reading the task file, scanning for event dependencies and embedding files and links needed for remote execution of the execution file, storing the dependencies in a dependency file, scanning for security, verifying the task file for proper formatting.

In yet another embodiment of the invention is a computer system for creating a portable unit on a first computer to be executed on one or more remote computers including: a one or more processors, a memory, a communications link and one or more databases containing: an execution file having one or more tasks for deployment, said tasks having command line arguments executable as variables by the remote computers, assembled into a single execution file, said one or more processors configured to: (a) validate the tasks, (b) collect nested task information and organize nested tasks, (d) account for all dependencies to insure that files, tasks, and environments for running on one or more remote computers are present in the portable unit. Furthermore, the one or more processors are configured to (a) create an execution file further configured to: (b) read the task file, scan for event dependencies and (c) embed files and links needed for remote execution of the execution file, (d) store the dependencies in a dependency file, (e) scan for security, (f) verify the task file for proper formatting and transmit the portable unit file.

DESCRIPTION OF PREFERRED EMBODIMENT

The present invention will now be described more fully hereinafter with reference to the accompanying drawings, in which preferred embodiments of the invention are shown. This invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
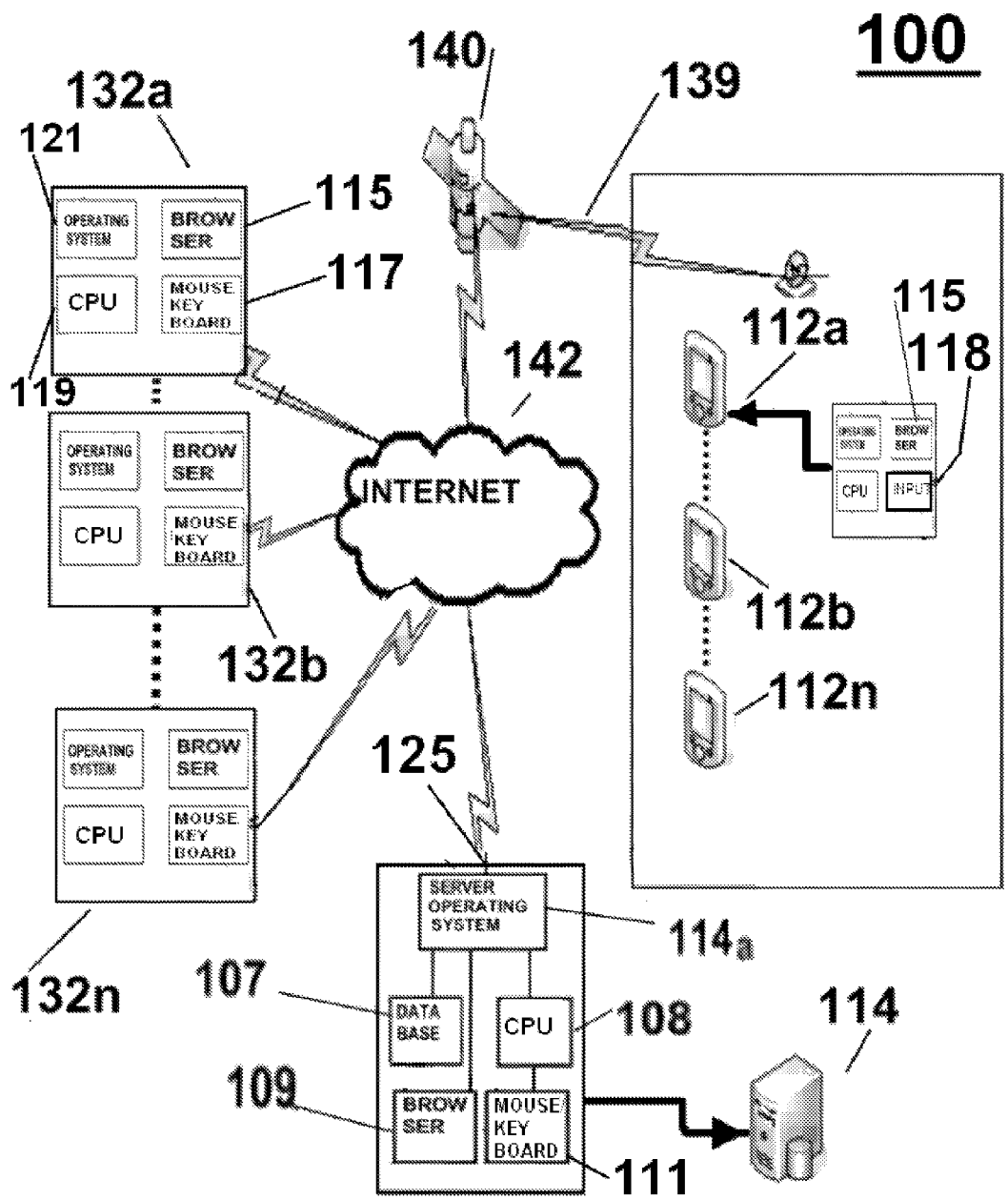
FIG. 1 shows a system for creating and porting one or more portable software execution file in accordance with an embodiment of the present invention.

FIG. 1 represents a system 100 where a user can create software processes in one environment that can be ported to remotely situated computers, such as to a production environment, partner's site, or customer's site. In such instances present technology takes a designed test case and executes it in another environment, but there is a constant need to improve the system to insure its usability by relatively non skilled computer users. System 100 includes software for creating, porting and running one or more portable software execution files. System 100 further includes at least one central processing computer 114 which typically serves as, or couples to, a computer server/operating system 114a, an Internet 142 presence, a plurality of remote computers 132a-132n and, by way of example, optional satellite communications and further by way of example to a plurality of mobile PDA 112a-112n. FIG. 1 of the present invention more specifically depicts the computer system 100 and the central computer 114 that includes the server/operating system 114a that is associated with a database 107, CPU 108, and software application for creating the portable software execution files utilizing a browser 109 and a mouse/keyboard 111. Once the portable software execution files are created they are ported via server operating system 114a to the plurality of remote computers 132a-132n or mobile PDA 112a-112n. The server/ operating system computer 114a includes at least one controller or central processing unit (CPU or processor) 108, at least one communication port 125 or hub, at least one random access memory (RAM), at least one read-only memory (ROM) and one or more databases or data storage devices such as database 107. All of these later elements are in communication with the CPU 108 to facilitate the operation of the server functionality.

The computer 114 may be configured in many different ways. For example, computer 114 may be a conventional standalone server computer or alternatively, the function of server may be distributed across multiple computing systems and architectures. Computer 114 may also be configured in a distributed architecture, wherein databases and processors are housed in separate units or locations. Some such servers perform primary processing functions and contain at a minimum, a RAM, a ROM, and a general controller or processor.

In such an embodiment, each of these servers is attached to communications port 125 that serves as a primary communication link with other servers, client or user computers, such as 132-132n and 112a-112n, and other related devices. The communications hub or port 125 may have minimal processing capability itself, serving primarily as a communications router. A variety of communications protocols may be part of the system, including but not limited to: Ethernet, SAP, SAS™, ATP, Bluetooth, GSM and TCP/IP.

Data storage device (not shown), within which systems, application and communications programs as well as database 107 may be stored, include a hard magnetic disk drive, optical storage units, CD-ROM drives, or flash memory. Data storage device contains databases e.g., database 107 used in processing the task action list to be further described below and/or calculations in accordance with the present invention, including at least a command structure for application in the construction of tasks as will also later be described in detail. In one embodiment, database software creates and manages these databases. Creation and porting of the portable software and related calculations and/or algorithms of the present invention are stored in storage device and executed by the CPU 108. A controller (not shown) resident in the CPU comprises a processor (not shown), such as one or more conventional microprocessors and one or more supplementary co-processors such as math co-processors. The processor is in communication with a communication port 125 through which the processor communicates with other devices such as other servers, user terminals or devices and the Internet 142. The communication port 125 may include multiple communication channels for simultaneous communication with, for example, other processors, servers or client terminals. As stated, devices in communication with each other need not be continually transmitting to each other. On the contrary, such devices need only transmit to each other as necessary, may actually refrain from exchanging data most of the time, and may require several steps to be performed to establish a communication link between the devices. The processor also is in communication with a data storage device. The data storage device may comprise an appropriate combination of magnetic, optical and/or semiconductor memory, and may include, for example, RAM, ROM, flash drive, an optical disc such as a compact disc and/or a hard disk or drive. The processor and the data storage device each may be, for example, located entirely within a single computer or other computing device; or connected to each other by a communication medium, such as a USB port, serial port cable, a coaxial cable, a Ethernet type cable, a telephone line, a radio frequency transceiver or other similar wireless or wireline medium or combination of the foregoing. The data storage device may store, for example, (i) a program (e.g., computer program code and/or a computer program product for creating, executing and porting the portable software) adapted to direct the processor in accordance with the present invention, and particularly in accordance with the processes described in detail hereinafter with regard to the creating, executing and porting the portable software; (ii) a database adapted to store information that may be utilized to store information required by the program for creating, executing and porting the portable software. The program for creating, executing and porting the portable software may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hardwired circuitry may be used in place of, or in combination with, software instructions for implementation of the processes of the present invention. Thus, embodiments of the present invention are not limited to any specific combination of hardware and software.

The term "computer-readable medium" as used herein refers to any medium that provides or participates in providing instructions to the processor of the computing device (or any other processor of a device described herein) for execution and more particularly for creating, executing and porting the portable software. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for creating, executing and porting the portable software. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The computer 114 bus carries the data to main memory, from which the processor retrieves and executes the instructions. The instructions received by main memory may optionally be stored in memory either before or after execution by the processor. In addition, instructions may be received via communication port 125 as electrical, electromagnetic or optical signals, which are exemplary forms of wireless communications or data streams that carry various types of information.

The computer 114 of the present invention may also interact and/or control one or more user devices or terminals such as 132a-132n. The user device or terminal 132a-132n and the PDAs 112a-112n may include any one or a combination of a personal computer with a CPU 119, an mouse/keyboard 117 or input 118, as an input device, a computer display, a touch screen, LCD, voice recognition software, or other generally recognized input/output devices required to implement the above functionality. The program also may include program elements such as an operating system 121, a browser 115, a database management system and "device drivers" that allow the processor to interface with computer peripheral devices (e.g., a video display, a keyboard, a computer mouse, etc.).

Figure 2A:
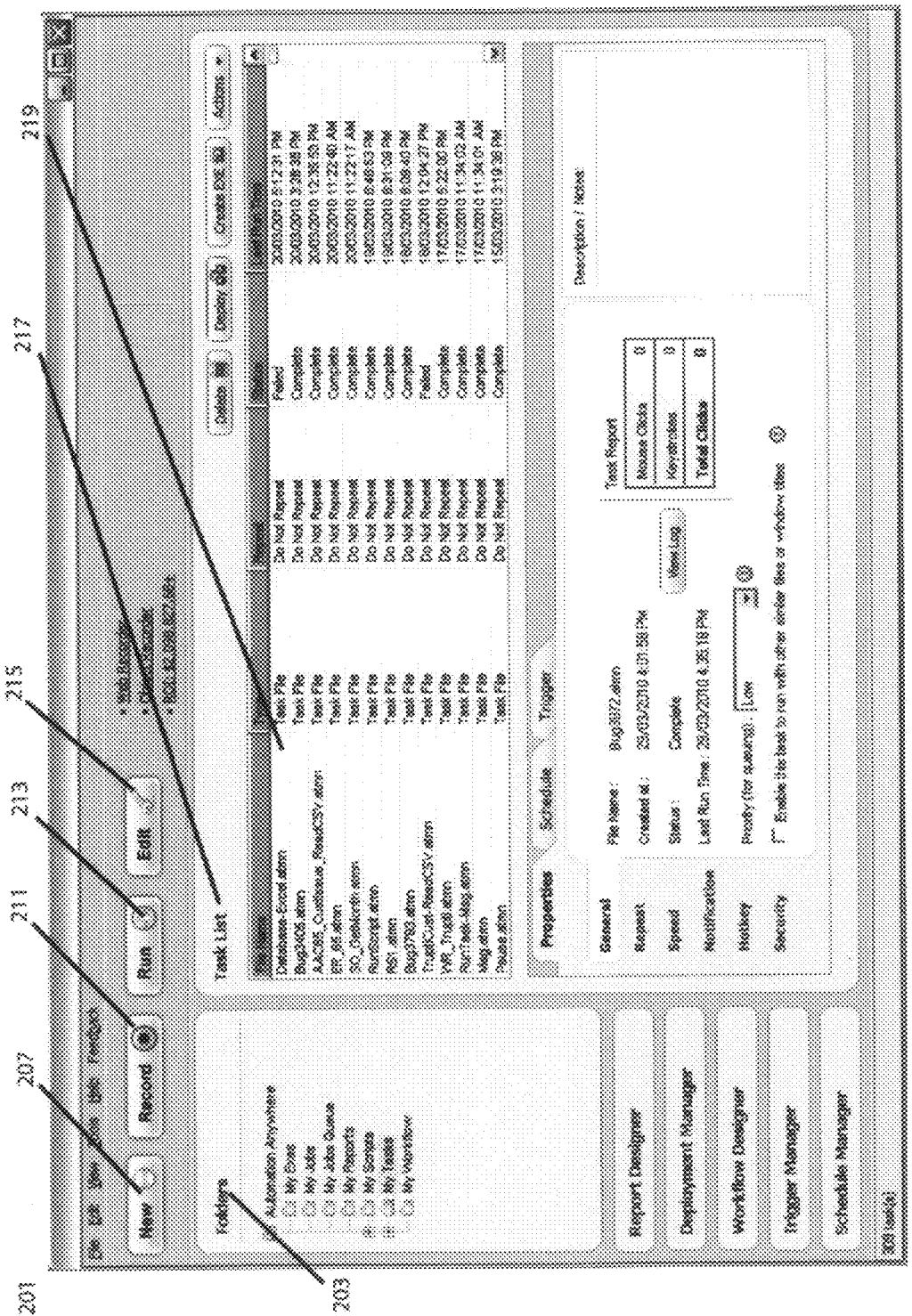
FIG. 2*a*-2*d* show browsers for creating and porting one or more portable software execution file in accordance with an embodiment of the present invention.
Figure 2B:
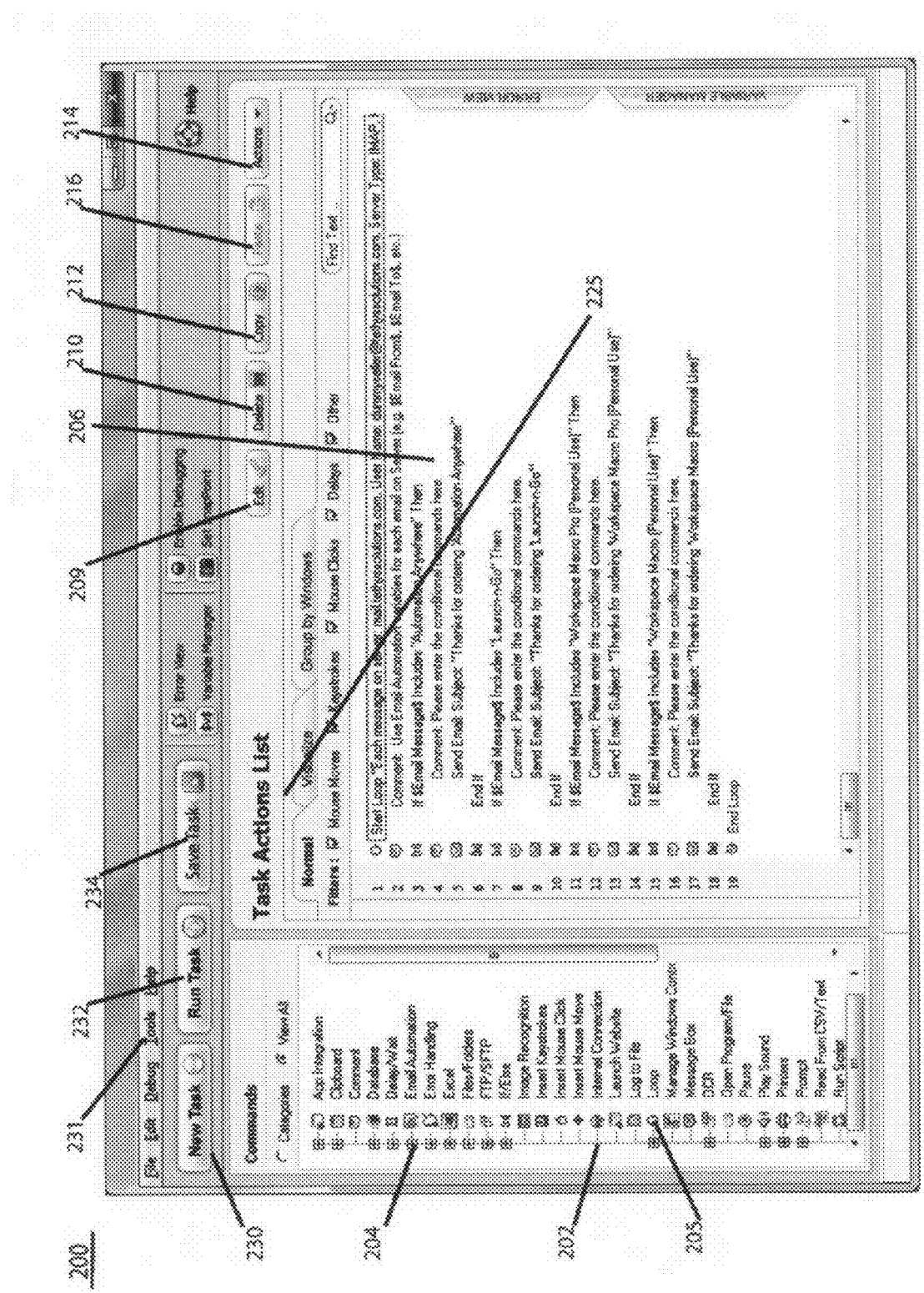
Figure 2C:

With reference to FIGS. 2a, 2b, 2c and 2d, and by way of example, a user of the system 100 may desire to create a task to be run at various times or repetitively on the local computer 114 or the remote computers 132a-132n. In the browser 109 a process as will be further described in connection with FIG. 4a and FIG. 4b, will permit the user to insert commands having single execution features or as part of a several line operation or one of several commands that may operate as part of a larger loop or nested loop. One embodiment of the invention is a portable unit 450 (FIG. 4b) that includes at least one new task file with task with commands referred to as an EXE 452 execution file (FIG. 4b). The commands create a task list incorporated as a series of tasks to be run by the EXE 452 execution file at a remote site. By way of example, a user selects from a menu of tasks an option such as 'Each email message on server' in order to read all emails that come from an email identification as defined. When the task is later executed this option will read each email one after the other. The process will also allow the user to click on Edit 215 function or to open Email Automation form, as indicated in FIG. 2c, where the Email Automation form lists all the details of the Email Server and also various optional functions to perform. For the purposes of this task, the user may select 'Get All Messages' and then save the command. The user then sets the condition for checking the emails. It identifies the action as to where to send the standard specific reply to anyone who by way of example may have purchased different products. The process will then upon execution check if condition in all email messages that arrive. For example a predefined system variable referred to as $Email message$ indicates to the system to inspect the entire body of the email message. The user essentially defines a string that it wants to locate from within the message. The Send Mail command to send emails. If the $Email message$ variable is found in the email message then a standard email will be sent. Sender email addresses are stored in the $Email From$ system variable that fetches the email address from the 'From' field. Having set up the task, the user then may run the task, locally. In accordance with an embodiment of the invention a user may also send the task off as a portable unit having an execution file referred to as an EXE 452 file for remote execution. In either instance in the present example, emails will sent to the specific customers according the products purchased.

More particularly with reference to FIG. 2a, a suitable computer program code may be provided for performing numerous functions such as displaying a start page 201 on the browser 109, to create a new task using point and click functionality as will be further described below, and as appropriate, to record 211 key strokes defining the new task, to run 213 the new task 207 and to edit 215 the new task, within the context of a task action list 217. The task action list 217 shows numerous tasks 219 that for illustration have been previously created. All tasks 217 can be organized into folders 203. The computer program code required to create a browser with the above functions (and the other functions described herein) can be developed by a person of ordinary skill in the art of programming, and is not described in detail herein.

As shown in FIG. 2b, suitable computer program code is provided for performing numerous functions such as displaying a task editor 200 on the browser 109, creating a new task to be ported, dragging commands into a task action list, and as appropriate, undoing, editing, deleting, copying and pasting commands within the context of the task action list. The computer program code required to implement the above functions (and the other functions described herein) can be developed by a person of ordinary skill in the art of programming, and is not described in detail herein. The task editor 200 contains two windows a task action window 206 and a command window 204. The task editor includes commands that are inserted into the take action window 206. In the prior art there are over 300 commands 202 to choose from in such systems. To each of the commands 202 added as tasks, the system 100 permits adjusting playback delays, inserting new actions or keystrokes, removing mouse moves, optimizing tasks, and creating new tasks. Commands 202 such as Clipboard, Database, Excel and Insert Mouse are but a few of the library of commands found.

FIG. 2b illustrates an example of an environment in which the invention works. Here, by way of example, a user desires to automate email processing whereby, if an email contains an order of a particular product of a hypothetical product line, a confirmation email is sent with a standard message. Therefore, emails are sent to specific senders according the product those purchase by them. The user begins by creating a new task via Tools 231, and utilizing the mouse 111 (FIG. 1) clicks on the function Task Editor (not shown). Browser 109, shown in screen display 200 shows the command window 204 where the Loop command 205 is located. The Loop 205 command will provide a list of options to choose from such as by way of example and not limitation, Start Loop commands: (e.g., (a) Loop For N times: Loops the actions between the Start Loop and End Loop commands the number of times a user specifies; (b) If a user wants to repeat the action 10 times, it places the actions between Start Loop and End Loop commands and specifies 10; and (c) Loop For List variable: where a user does not know how many times a task needs to loop, it may have a list variable with many values in it. If for example the value is 10, then using this command the user can repeat the actions within the Start Loop/End Loop block as many times as there are items in the list variable. Once the user determines the proper Loop Start command then that command is dragged and dropped into the Test Actions List 225 in the task action display window 206. The user selects the option 'Each email message on server' to read all emails that come from an email identification as defined in this example as dummyseller@tetlysolutions.com. This option will read each email one after the other. The user then uses the mouse to click on Edit 209 to open Email Automation, the form illustrated in FIG. 2c which lists all the details of the Email Server as well as various functions to perform. For the purposes of this exemplar, the user selects 'Get All Messages' 240. Again referring to the Test Actions List 225 window 206, an 'IF condition' is inserted for checking the emails. The variable called $Email message$ contains the body of the message whereby the user defines a string that it wants to find from within the message. In this case if the email message includes the words 'Automation Anywhere' then Enter Send Mail command sends emails satisfying the condition with the subject: "Thanks for ordering "Automation Anywhere." If the $Email message$ variable contains the specific word then a standard email will be sent. In reply to anyone who has purchased the different products, the 'If conditions' are altered accordingly as illustrated in the various email messages that include "Launch-n-Go, Workspace Macro Pro [Personal Use]". The sender email addresses are stored in the $Email From$ system variable that fetches the email address from the 'From field'. When the Task Action List 225 is complete then the user can save 234 and run test 234 to determine if the task as created works as intended. When the user runs this task, it loops through the emails and sends a standard reply to the emails that has order information for each designated product in the product line.

Figure 2D:
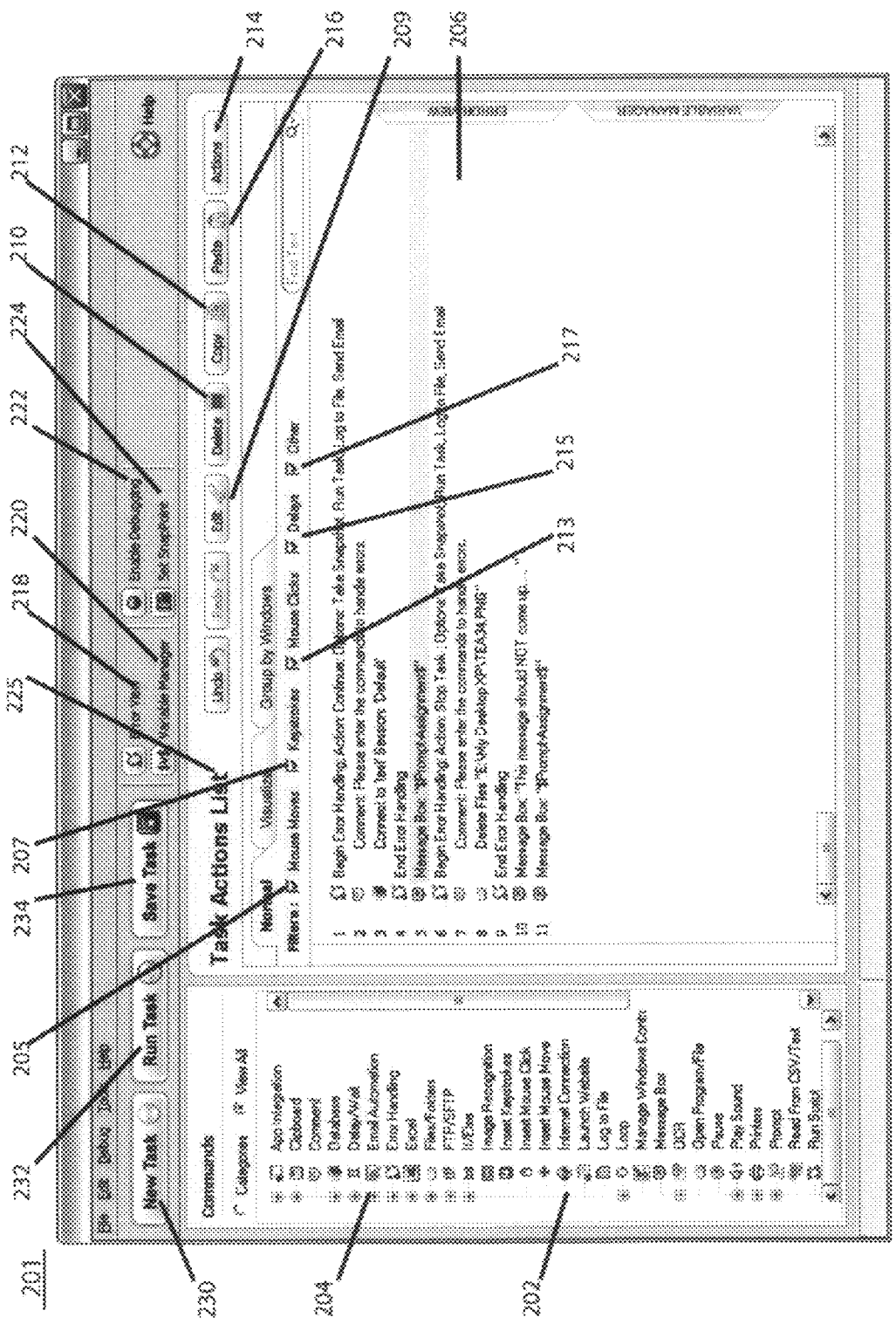

Referring now to FIG. 2d, once a task action list has been assembled from the commands 202 into the task action window 206, by way of example and not limitation, a user can select various actions regarding the command such as: Edit 209, Delete 210, Copy 212 and Paste 216 where the copied action is pasted below the cursor marked action. In addition to the basic functions as described, an action 214 permits viewing and editing enabled features corresponding to the selected action. Features include: bulk editing for editing multiple delay or keystroke actions; duplicating an action below the marked action; undoing and redoing an action; converting to variable; converting a keystroke to a variable; converting to prompt; converting a keystroke to a prompt message; converting to 'If Web Control Exists'; inserting an 'If condition'; insert 'If condition' for a selected block of task actions; insert error handling; insert error handling for a selected block of task actions; changing window title; setting a window title to multiple window titles; running from 'This Step'; running the task from a selected action onwards; enabling an action; disabling an action; moving up and moving down an action. In addition a user may record mouse moves 207, mouse clicks 213, control or delay the execution of tasks 215, and other features 217 that may exist from time to time. The browser 109 also allows an error view 218, enabling debugging 222 and setting a screen shot 224. A variable manager 220 allows control over variables that will be loaded at run time as part of the EXE 452 execution. Those persons of ordinary skill in the art of programming will appreciate the forgoing list of actions and how they are utilized in connection with building a task list as described.

Figure 2E:
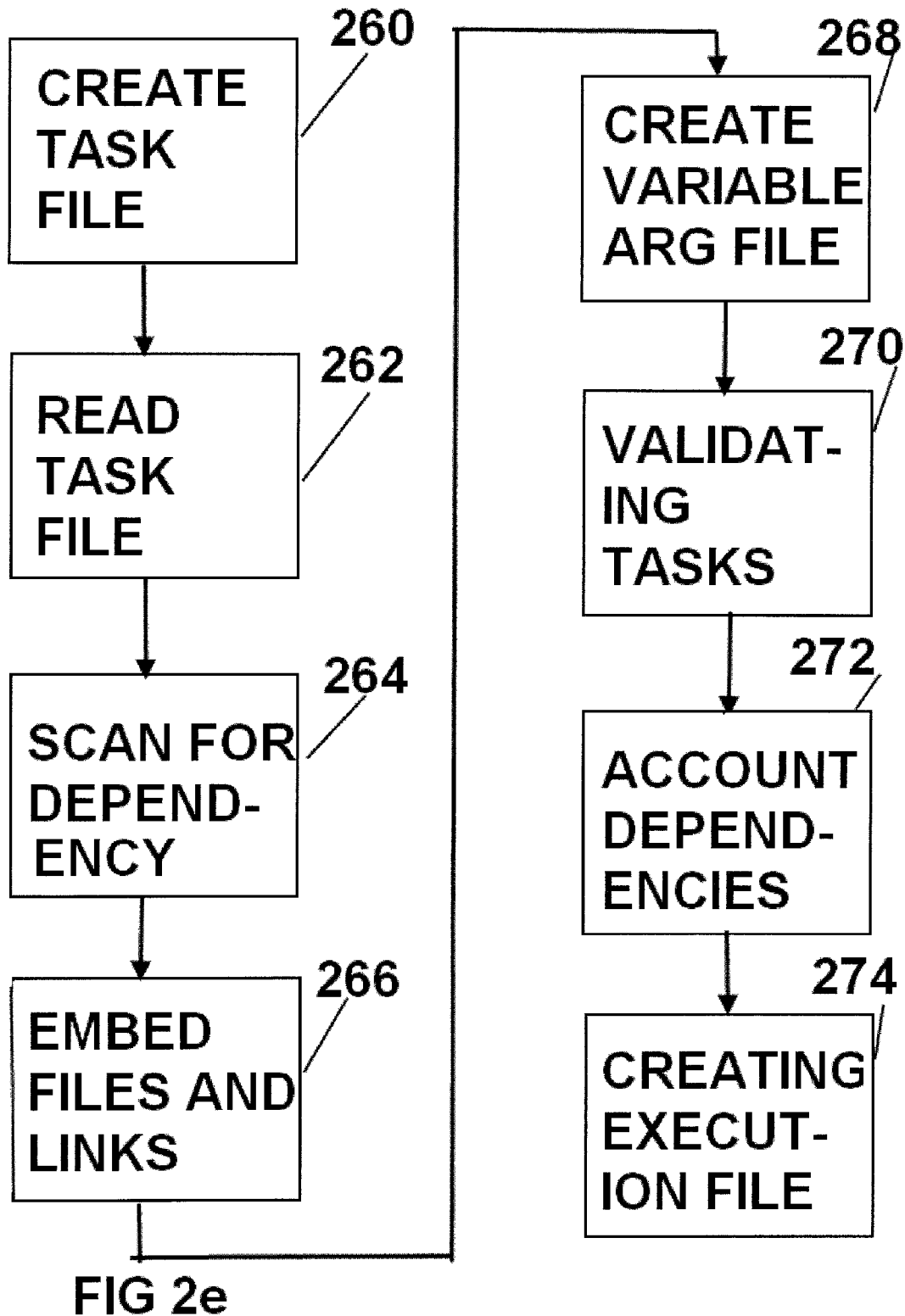
FIG. 2*e* shows a flow diagram of the creation of executable portable software execution files in accordance with an embodiment of the present invention.

One embodiment of the invention as shown in FIG. 2e is a computer method for creating a portable unit (FIG. 4b) on a first computer (FIG. 1, 114) to be executed on one or more remote computers (e.g., FIG. 1, 123a-132n) comprising the steps of: creating an execution file 274 having one or more tasks for deployment, by reading the task file 260 and scanning for dependencies, 264. The scanning for dependencies deals with ascertaining nested tasks, variable arguments and insures that the process embeds the necessary files and links for execution of the execution file at the remote site. For example, the tasks may have command line arguments which are executable as variables by the remote computer. A variable argument file 268 is appended to an assembled into a single execution file (FIG. 4b, 252). The process validates the tasks 270 and organizes nested tasks, wherein the organizing step includes collecting nested task information for each task and accounting 272 for all dependencies to insure that files, tasks, and environments for running on one or more remote computers are present in the portable unit that contains the execution file as developed in 274 and which is part of the portable unit as further discussed in connection with FIG. 4b.

Figure 3:
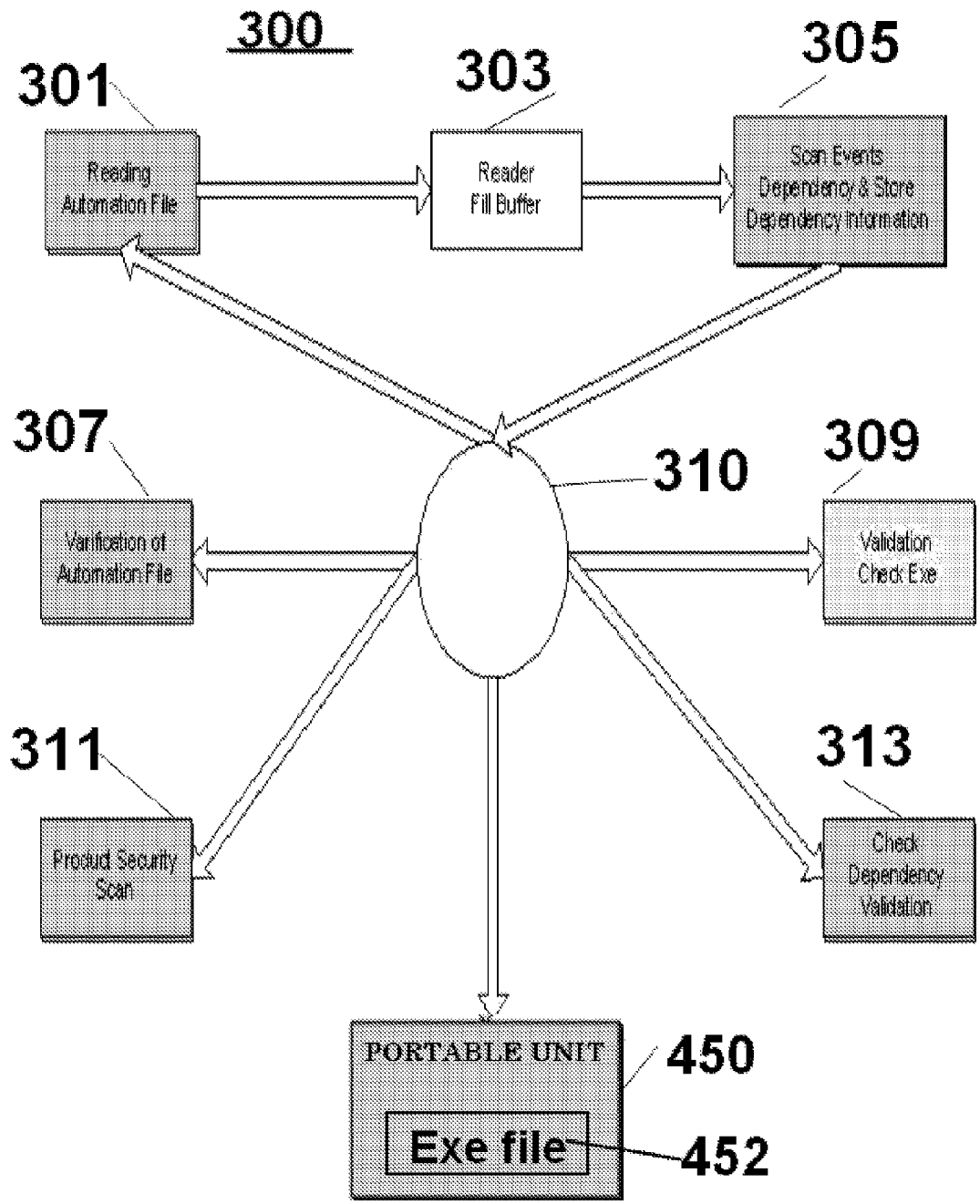
FIG. 3 shows a diagram for the creation of executable portable software execution files in accordance with an embodiment of the present invention.

FIG. 3 shows a diagram of the creation of executable portable unit software having an execution file therein in accordance with an embodiment of the present invention. Once a user creates a task as for example illustrated in FIG. 2b-2d, the system 100 utilizing process 300 of FIG. 3 prepares the task to being executed or run. The process 300, running from for explanation purposes a virtual hub 310, performs the step of reading 301 the task file into a reader fill buffer 303 where the file undergoes scanning 305 for event dependencies and when it locates a dependency stores the dependency as a dependency file in a storage device for later running of the task.

During buffer filling 303 the process 300 scans each event and related dependency information, property information, each such piece of information necessary for running the final execution file. An event may be by way of example and not limitation, as found in one embodiment, specified as Run Script, Run Macro, Optical Character Recognition ("OCR"), Application Integration, Terminal Emulation, Email Automation, Send Email, Web Recorder, Microsoft Exchange Server, etc. Certain commands such as OCR require a specific dynamic library link ("DLL") to run properly at remote site machines. Process 300 inspects for their dependency and embeds those files needed as well as imbeds such DLLs in the portable unit as further described below. For example, Visual Basic Scripting Edition ("VBScript") an active scripting language, developed by Microsoft, which uses the component object model to access elements of the environment within which it is running (e.g. FileSystemObject used to create, read, update and delete files). A VBScript script must be executed within a host environment, which is embeddable in other programs, through technologies such as the Microsoft Script control (msscript.ocx). If the process 300 needs to run a VB Script, then utilizing the 'Run Script' command, process 300 embeds the proper environment in the portable unit 450 (also, see FIG. 4*b*) for it to run the VBScript on the remote machine.

Process 300 inserts a variety of smart tags in the file. Smart tags enable the system to recognize certain types of data in a document (for example, dates or names) and automatically make such text a smart tag, optionally visually indicated. Clicking on a smart tag results in a selection-based search command that then brings up in browser 109 a list of possible actions for that data type. An enhanced logic of file reading can read a presently created task file as well as files created using prior art systems. If during the process of reading 301 any error occurs then process 300 displays an appropriate error message to the user via browser 109 (FIG. 1). Having created a dependency file, the process 300 performs the step of verifying 307 the task file for proper formatting and validating 309 the task file insofar as insuring that there is no blank task attached. Process 300 checks that the file selected for "Create Exe" is a valid file including smart tags defined within the file. If any verification of the file fails then process 300 guides user to specific error description via browser 109 messages and instructions. If during product security scanning 311 any error occur then process 300 displays the appropriate product security message on the browser 109 (FIG. 1). In the check EXE 452 validation 309 block the process validates files before proceeding to the reading 301.

With further reference to FIG. 3, in one embodiment of the invention, the process 300 determines if there are nested task files. A nested task is one where the user can run a child task from somewhere inside a parent task and then when the child task is done, the control resumes to the parent task. A nested task is essentially a parent task or a caller task. During the step of validating 309 the process 300 collects nested task file information for each task. Then process 300 one by one scans all files using smart logic. The process 300 checks dependency validation as per task requirements collected during the scanning 305 process. Process 300 also scans all properties related information and checks its validity with respect to each action which exists inside the task underway. If a step in the task is not valid then the process will display in browser 109 (FIG. 1) an appropriate error is signaled, through which a user is guided to correct the task entry in error. During the validation, process 300 collects information and has software added to support options for attaching by way of example and not limitation, VBScript, or JavaScript, the small, lightweight, object-oriented, cross-platform scripting language, as well as to validate mainframe supports such as IBM Models TN3270 and TN5250.

Further process 300 steps perform scanning 311 product security for task calls to other tasks, which may in turn call other tasks and so on. The process 300 allows the creation of deployable single EXE 452 files that automatically account for all dependencies. Thereafter process 300 checks 313 the validation of the dependency list, i.e., to insure that all the files/tasks/environments/needed to run the EXE 452 task files are present in the portable unit. In one optional embodiment of the invention, the portable unit 450 feature may only be available for certain subset tasks, so that the process 300 check 313 of the validation insures that the user has the correct version. Process 300 check 313 of the validation also insures that the user has the correct product release number for backward compatibility.

FIG. 2*b* illustrates an example of an environment in which the invention works. Here, by way of example, a user desires to automate email processing whereby, if an email contains an order of a particular product of a hypothetical product line, a confirmation email is sent with a standard message. Therefore, emails are sent to specific senders according the product those purchase by them. The user begins by creating a new task via Tools 231, and utilizing the mouse 111 (FIG. 1) clicks on the function Task Editor (not shown). Browser 109, shown in screen display 200 shows the command window 204 where the Loop command 205 is located. The Loop 205 command will provide a list of options to choose from such as by way of example and not limitation, Start Loop commands: (e.g., (a) Loop For N times: Loops the actions between the Start Loop and End Loop commands the number of times a user specifies; (b) If a user wants to repeat the action 10 times, it places the actions between Start Loop and End Loop commands and specifies 10; and (c) Loop For List variable: where a user does not know how many times a task needs to loop, it may have a list variable with many values in it. If for example the value is 10, then using this command the user can repeat the actions within the Start Loop/End Loop block as many times as there are items in the list variable. Once the user determines the proper Loop Start command then that command is dragged and dropped into the Test Actions List 225 in the task action display window 206. The user selects the option 'Each email message on server' to read all emails that come from an email identification as defined in this example as dummyseller@tetlysolutions.com. This option will read each email one after the other. The user then uses the mouse to click on Edit 209 to open Email Automation, the form illustrated in FIG. 2*c* which lists all the details of the Email Server as well as various functions to perform. For the purposes of this exemplar, the user selects 'Get All Messages' 240. Again referring to the Test Actions List 225 window 206, an 'IF condition' is inserted for checking the emails. The variable called $Email message$ contains the body of the message whereby the user defines a string that it wants to find from within the message. In this case if the email message includes the words 'Automation Anywhere' then Enter Send Mail command sends emails satisfying the condition with the subject: "Thanks for ordering "Automation Anywhere." If the $Email message$ variable contains the specific word then a standard email will be sent. In reply to anyone who has purchased the different products, the 'If conditions' are altered accordingly as illustrated in the various email messages that include "Launch-n-Go, Workspace Macro Pro [Personal Use]°. The sender email addresses are stored in the $Email From$ system variable that fetches the email address from the 'From field'. When the Task Action List 225 is complete then the user can save 234 and run task 232 to determine if the task as created works as intended. When the user runs this task, it loops through the emails and sends a standard reply to the emails that has order information for each designated product in the product line.

FIG. 4*b* shows a block diagram of a portable unit 450 software with the execution file EXE 452 in accordance with an embodiment of the present invention. The portable unit 450 includes at least one new task file with task with commands referred to as EXE 452 file. A command may have arguments or variables that require values associated with the task before the task can be run. When the portable unit is sent to a remote location for execution, a file of values for each of the variables or arguments associated with each command requiring a value at run time is sent as well. Essentially the variable arguments file 462 allows passing values for the arguments dynamically at the time of the EXE execution start at the remote site. In an alternate embodiment of the invention, the variables or arguments associated with each command requiring a value at run time may be inputted by the remote user before running the EXE 452 at the remote site. In order to execute or run the portable unit 450 at the remote site a lightweight play engine 454 is also sent as part of the portable unit 450. A dependency file 458, automation and supported information file 456, a variable repository 462 allows passing variables as arguments and to set variable values dynamically at the time of EXE's execution start at the remote site. The nesting routines process 460 associated with the tasks are also bundled into the portable unit. The EXE may have loops, and nested loops as earlier described. The process 460 scans the EXE 452 for loops and nested loops and determines if there are duplicate loops with the larger EXE 452 task list. If there are then the process 460 provides calls to a common set of commands to reduce the number of times a loop or nested loop has to be duplicated in the task list. The portably unit will run the loops at execution time based upon the call list provided by the process 460.

Figure 4A:
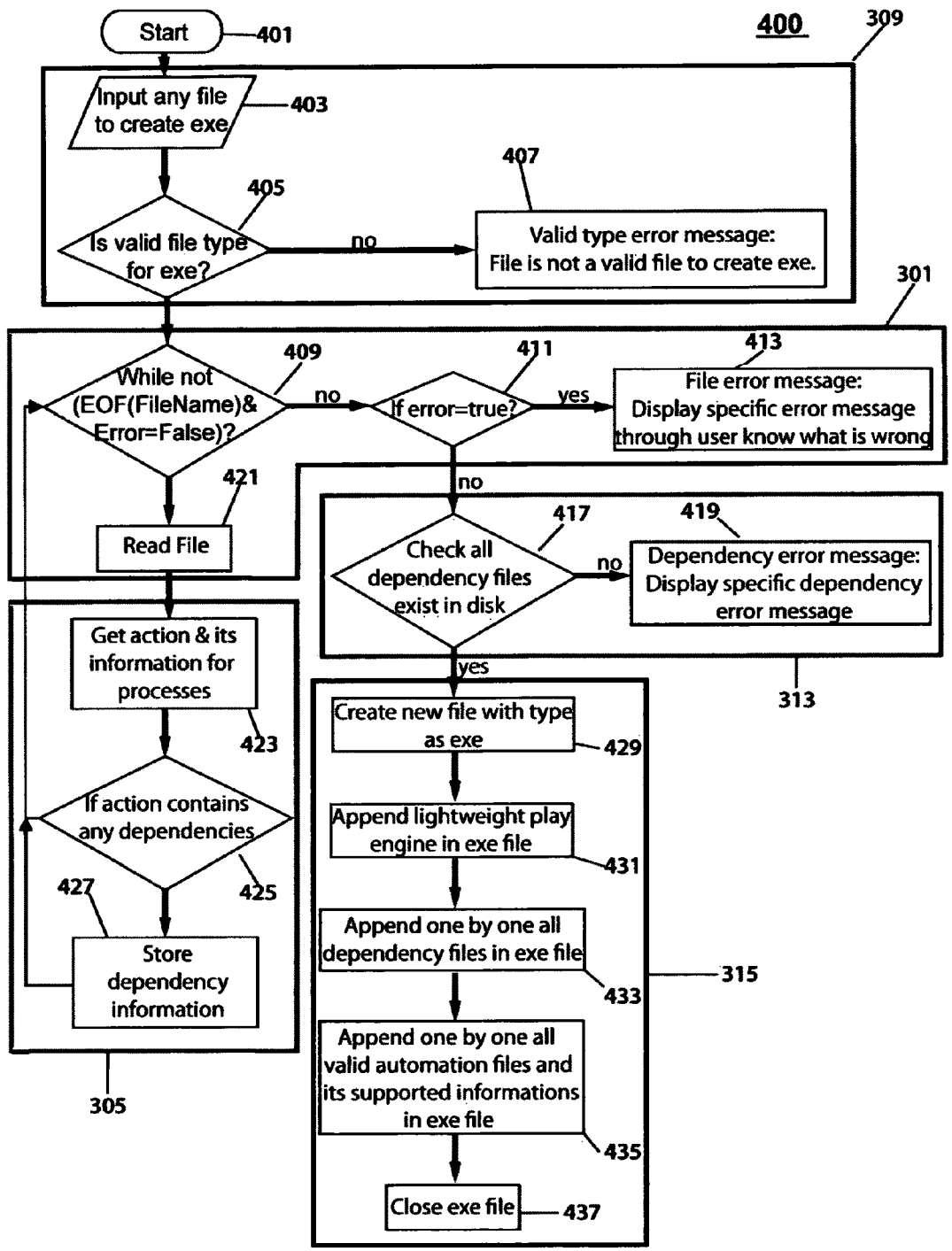
FIG. 4a shows a flow chart for the creation of executable portable software execution files in accordance with an embodiment of the present invention.
Figure 4B:
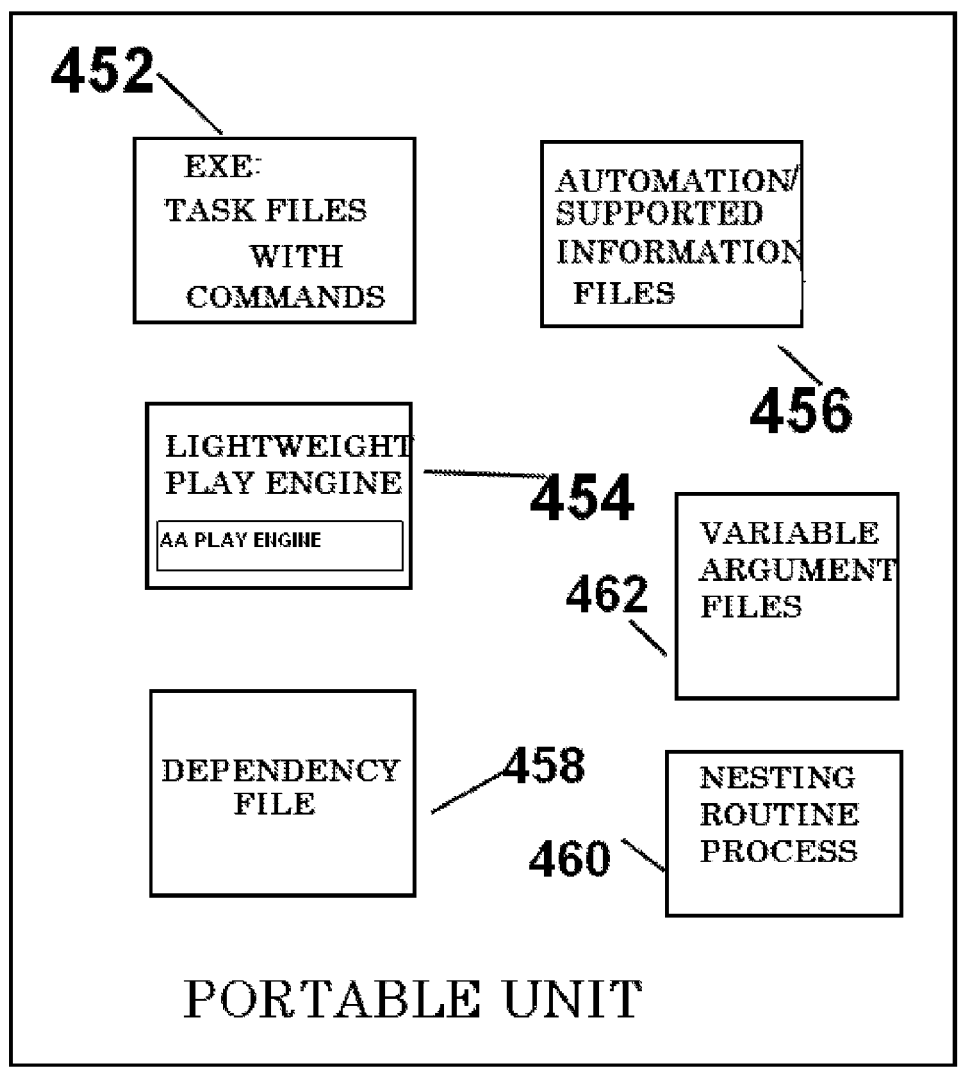
FIG. 4b shows a block diagram of a portable unit software execution file in accordance with an embodiment of the present invention.
Figure 5:
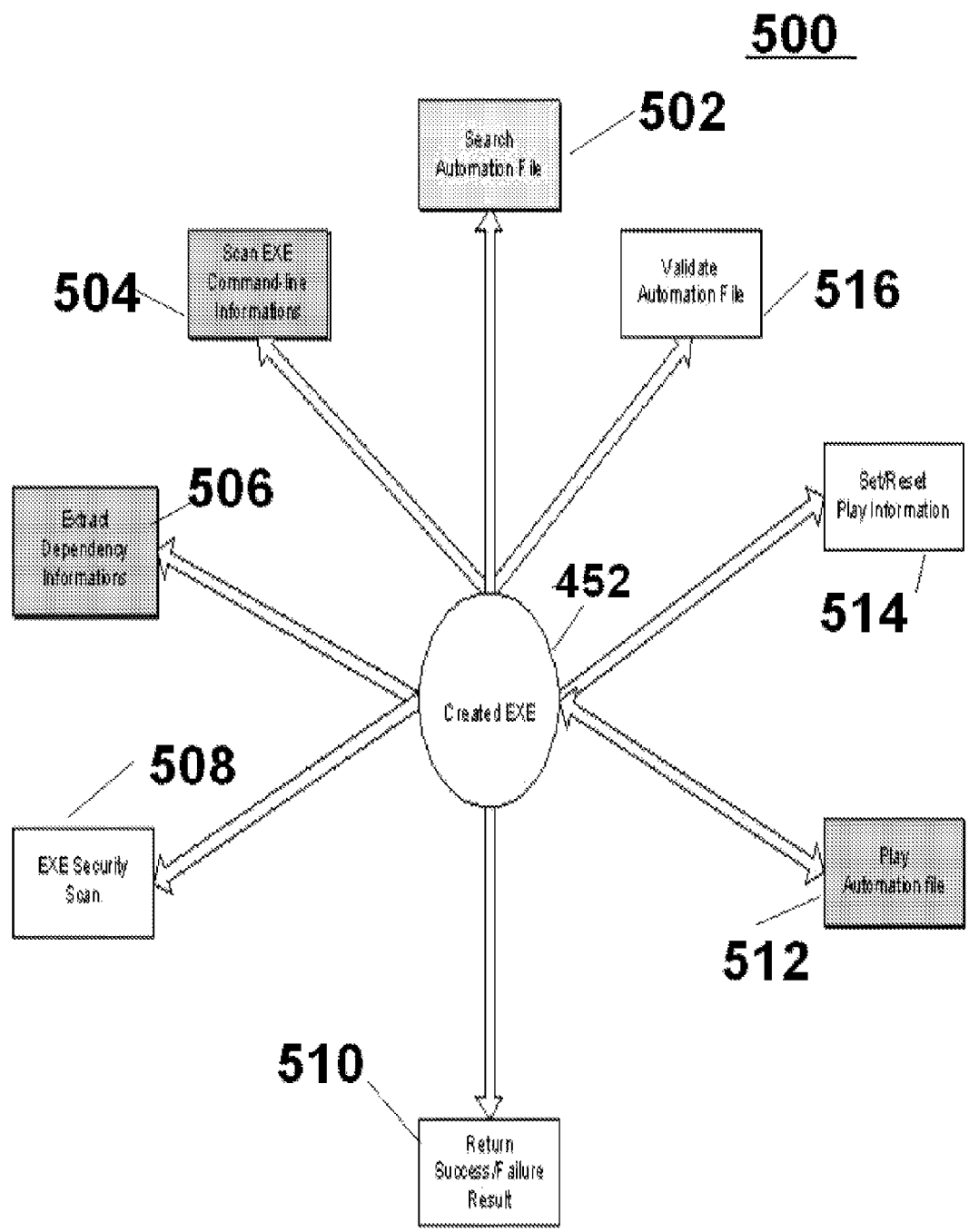
FIG. 5 shows a diagram for the creation of executable portable software execution files in accordance with an embodiment of the present invention.

Having created the portable unit as illustrated in FIG. 3, FIG. 4*a*, and FIG. 4*b* the portable unit 450 is ported or communicated to a remote computer for execution. FIG. 5 shows a chart of the play feature of the executable portable unit 450 software execution file in accordance with an embodiment of the present invention. During initialization of EXE 452 execution files the process 500 performs step 508 a security information scan of the EXE 452 file. The portable unit 450 EXE 501 will start its execution by making copy of itself inside employing the temp directory in the user's operating system or at a location based on information passed with the portable unit 450. From the chosen location process 500 starts execution of the EXE file with command information. In searching 502 file process 500 seeks to find any unsupported runs that effectively operate as nested run tasks and if it finds a requirement to loop, then it provides logic to run the unsupported task. Process 500 then proceeds to step 504 where scan EXE command line information in the form of command line arguments enable the created EXE file to use the arguments created during process 300. It also takes input variables with its value from command-line during the initialization process. In step 506 the process 500 extracts dependency information and takes necessary actions as the portable unit 450 EXE 542 runs its operations. Depending on command-line arguments process 500 evaluates the information to extract each and every item of dependency information. Process 500 extracts one by one all dependency files which are required to run the EXE file, such as by way of example script engines, script files, Application Integration, Email Automation, Email Sent, Notifications, etc. Process 500 then performs step 514 play file and finds the specific file to start playing 512 the portable unit 450 EXE 452 using the light weight engine. If process 500 finds a nested task file then it first collects information about that task file and starts a new process of self execution and waits to finish execution of the previous process 500. If the EXE file contains script files then it first looks at the files at the EXE file's extracted locations. If a script file is found there then process 500 uses that file, otherwise it finds a file at user's location which defines the events. Process 500 embeds certain execution engines obtained from third party DLLs, in order to execute certain commands and prior to final assembly of the portable unit 450 process 500 checks on the remote machine's environment/program to ascertain if the same engines exist as well as whether the same version is installed.

Figure 6:
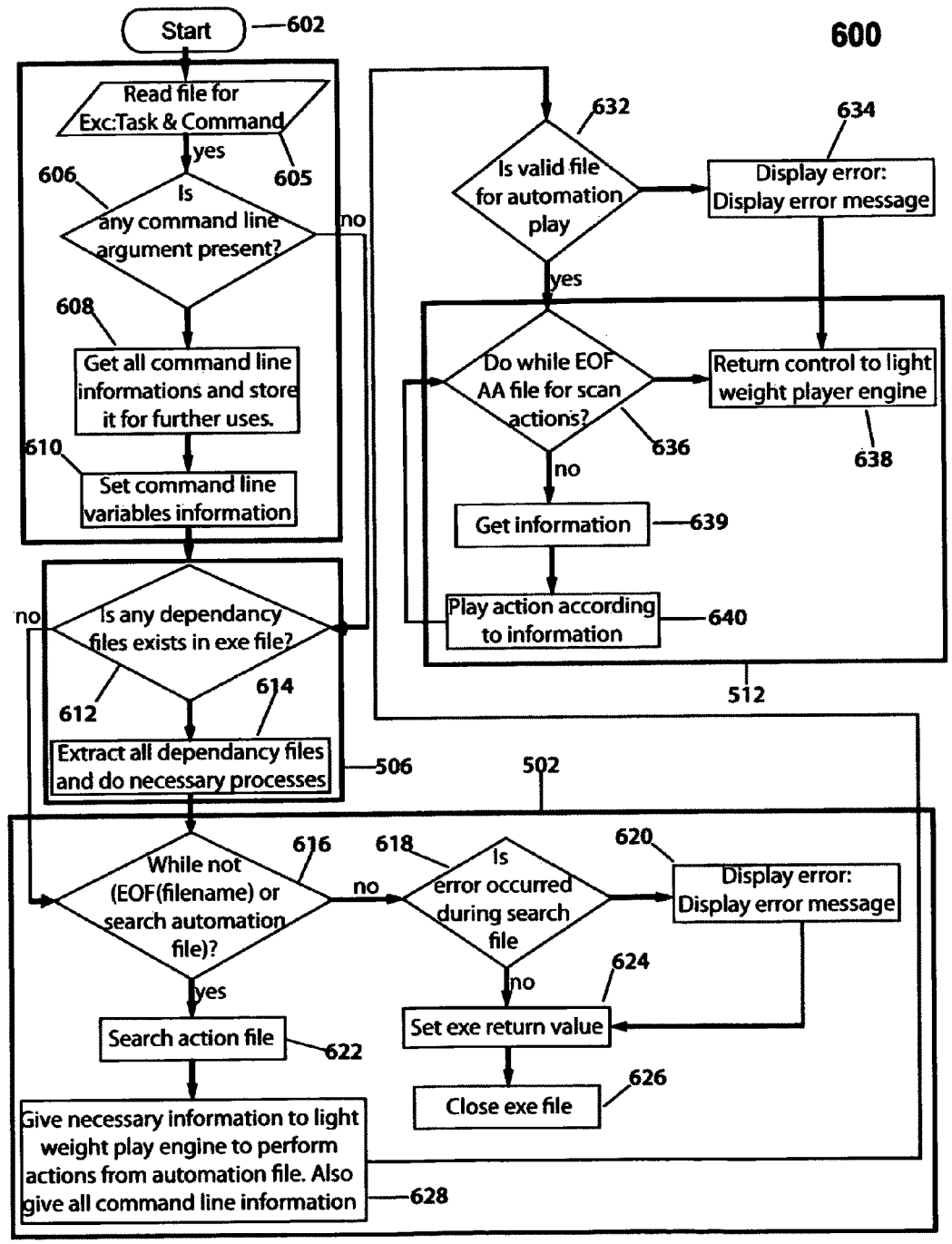
FIG. 6 shows a flow chart of the play feature of executable portable software execution files in accordance with an embodiment of the present invention.

The flow chart in FIG. 6 elaborates on the steps outlined in FIG. 5 to run the portable unit 450 (FIG. 4*b*) in accordance with an embodiment of the present invention. At start 602 the remote system of FIG. 1 (132*a* through 132*n* or 112*a*-112*n*) receives a portable unit 450 file including the components as outlined in FIG. 4*b*. Process 600 reads 605 files as an acceptable file type as generated in process 500. Process 600 performs a check 606 for the presence of any command line arguments that require the insertion or incorporation of argument values 610. If there are no arguments requiring values then dependency 612 is checked and if dependencies do not exist then process 600 reads the EXE 452 task file to determine 616 if the end of file (EOF) has been reached. If it has been reached then a determination if an error 618 has occurred. If no error has occurred then process 600 sets 624 the return value and closes the 626 the EXE 452 file. Any Windows executable program returns a return value when it's finished running As such the portable unit, which represents a self executable Windows exe, returns a value 0 on successful completion and 1 otherwise, allowing a caller program, if any, to determine the outcome of the particular EXE 452 task file.

If there is an error they process 600 displays an error message 620. By way of example, a error message 620 might indicate the inability to locate a file and would alert the user as follows: "Error Message: Cannot find key file "C:\My Documents\Automation Anywhere\Automation Anywhere\My Task\Tethys.atmn" in Auto.exe."

Returning now to the check 606 for the presence of any command line arguments, if an argument is required in a command then all command line information 608 is retrieved and stored for later use when playing or executing the portable unit 450 EXE 452 file. Following the retrieval of the command-line information the command-line variable information is set 610. There is a separate variable subsystem (not shown) where all variables are stored in an array in memory with respective values and when the commands are executed, the variable values are obtained from that array. The command line values for those variables are used to 'initialize' the variables in that array.

Dependency 612 is checked and as previously indicated, if dependencies do not exist then process 600 reads the EXE 452 task file to determine 616 if the end of file (EOF) has been reached. However, if a dependency 612 is found to exist then process 600 extracts 614 all dependency files and does the necessary processing. Process 500 embeds certain execution engines obtained from third party DLLs, in order to execute certain commands. As indicated above, when process 500 embeds the engines it first checks on the remote machine's environment/program to ascertain if the same engines exist as well as whether the same version is installed. If so, process 600 employs the already installed environment.

As previously indicated the process 600 then reads the EXE 452 task file to determine 616 if the end of file (EOF) has been reached. And if it has not been reached then the process 600 searches 622 the action file, which is indicative of what actions are to be taken by the process. At step 628 the process 600 provides the necessary information to the lightweight play engine to perform actions for the running of the portable unit 450 EXE 452 file and also provides all command line information to the lightweight play engine. By way of example, necessary information might include how many times to repeat a task, at what speed, and whom to notify when the task has completed running.

Having provided the necessary information and command line information to the lightweight player, process 600 checks to determine 632 if the file is a valid EXE 452 file. If it is not a valid file an error 634 is displayed. By way of example, an error message 634 might indicate the inability to locate a file and would alert the user as follows: "Error Message: Cannot find key file "C:\My Documents\Automation Anywhere\Automation Anywhere\My Task\Tethys.atmn" in Auto.exe." If the file is valid, then it determines 636 if an EOF has been reached and if it has then the process 600 returns control 638 to the lightweight play engine. If it has not reached an EOF, then the process 600 gets the action information 639 and plays the action 640 and remains in the loop 636, 639 and 640 executing the commands and tasks in the portable unit.

Figure 7:
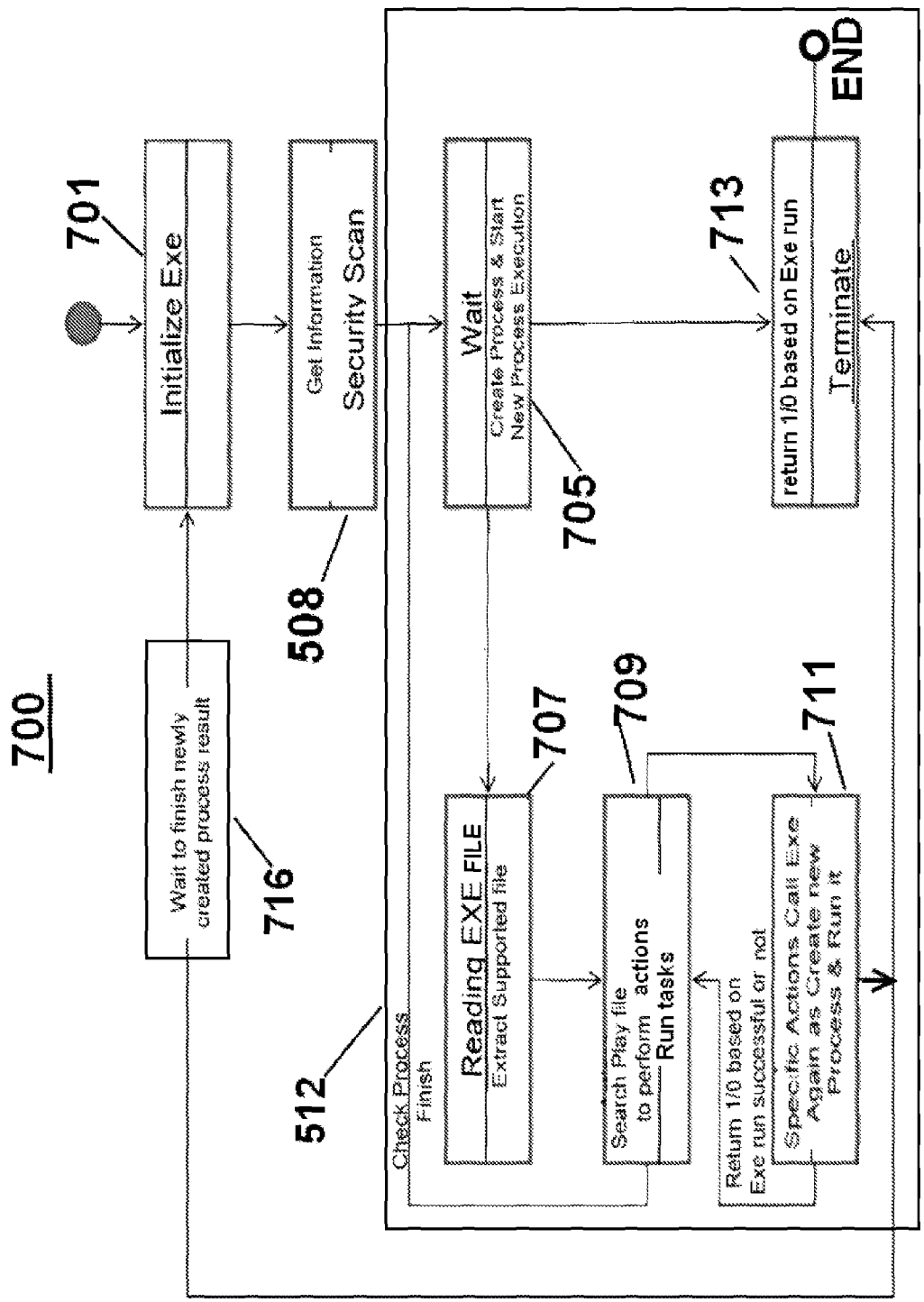
FIG. 7 shows a state diagram for the play engine in accordance with an embodiment of the present invention.

Turning to FIG. 5, FIG. 6 and FIG. 7 and the play engine described in FIG. 4b, reference 454 the operation of the play engine is further described, particularly with respect to action 640 and loop 636, 639 and 640 executing the commands and tasks in the portable unit 450 (FIG. 4b). The play engine launches by initializing 701 the EXE 452 for execution. To perform security scan 508 information is retrieved as required. In step 705 waits as the process to execute the EXE 452 files with special arguments is read and assembled. The next series of operations 707, 709, 711 and 713, are the process 500 step 512 as earlier described. The process reads the EXE 452 file 707 to among other things extract dependency files. It then runs the file by searching the play file to perform the specified actions and then executes the actions. Additionally, if there is a nested operation as one of the tasks or series of tasks then step 709 creates a new instance of EXE 452 and starts execution by returning to step 705. At step 711, if the final task action has not been executed then the process returns to running 709. If the EXE 452 indicates that there is a newly created EXE 452 task to run the wait step passes control to the initialize step 716 and 701. Otherwise if there are no other EXE 452 files to run the process proceeds to terminate the process 713.

While the foregoing invention has been described with reference to the above embodiments, additional modifications and changes can be made without departing from the spirit of the invention. Accordingly, such modifications and changes are considered to be within the scope of the appended claims.

I claim:

1. A computer method for creating a portable unit on a first computer to be executed on one or more remote computers comprising the steps of:
    creating an execution file having one or more nested tasks for deployment, said tasks having command line arguments executable as variables by the remote computer, assembled into a single execution file and storing the variables in an array of memory with respective values, said step of creating the execution file further including:
    starting the inputting of one or more files as key strokes;
    converting said keystrokes to a variable; converting to prompt; converting a keystrokes to a prompt message;
    defining a new task files and recording of the new task files into the execution file;
    validating the recorded new task files for event dependency, wherein validating comprises inserting a tag into the new task files, wherein the tag is automatically recognized as a data type in the file;
    stopping the recording of the inputting of one or more files into the execution file;
    organizing the new task files into nested tasks, said organizing step including collecting nested task information for each new task file and accounting for presence of all dependencies in the portable unit including files, tasks, and environments for running the execution file on one or more remote computers;
    wherein the accounting of all dependencies in the nested tasks includes scanning the execution task file for event dependencies to identify additional files and links needed for remote execution of the execution file and embedding the identified additional files and links into the execution file;
    storing the dependencies in one or more dependency files, appending to the execution file: a light weight play engine, the one or more dependency files and support information;
    closing the execution file;
    reading the execution task file having the one or more of nested tasks, wherein the reading comprises:
    initializing the execution file by making a local copy of the execution file;
    scanning the execution file for security, wherein the scanning includes checking the nested task for task calls to other tasks and backward compatibility; and ascertaining existence of the play engine;
    creating a new instance of the execution file, wherein the execution file comprises command line arguments creating the scan and the initialization;
    verifying the execution task file having one or more tasks contains proper formatting and with respect to each action, collecting information and adding software to support one or more options that includes one of a scripting language or validation of mainframe supports;
    sending dynamically during execution a file of values for each of the variables or arguments associated with each command and passing values for the arguments dynamically at the time of the execution start at the remote location; and
    checking for the presence of any command line arguments that require the insertion or incorporation of argument values and any errors reading the files;
    checking the one or more dependency file errors and outputting errors for each failed dependency;
    repeating sending, checking for the presence of any command line arguments and checking the one or more dependency file errors, until an end of file is detected;
    closing the execution file.

2. The computer method as in claim 1, wherein the script language can have a non-existent script path so that the remote computer can run when tasks include external scripts.

3. A non-transitory computer readable medium for creating a portable unit on a first computer to be executed on one or more remote computers comprising code for: creating an execution file having one or more nested tasks for deployment, said tasks having command line arguments executable as variables by the remote computer, assembled into a single execution file and storing the variables in an array of memory with respective values, said step of creating the execution file further including:
    starting the inputting of one or more files as key strokes;
    converting said keystrokes to a variable; converting to prompt; converting a keystrokes to a prompt message;
    defining a new task files and recording of the new task files into the execution file;
    validating the recorded new task files for event dependency, wherein validating comprises inserting a tag into the new task files, wherein the tag is automatically recognized as a data type in the file;
    stopping the recording of the inputting of one or more files into the execution file;
    organizing the new task files into nested tasks, said organizing step including collecting nested task information for each new task file and accounting for presence of all dependencies in the portable unit including files, tasks, and environments for running the execution file on one or more remote computers;

wherein the accounting of all dependencies in the nested tasks includes scanning the execution task file for event dependencies to identify additional files and links needed for remote execution of the execution file and embedding the identified additional files and links into the execution file;

storing the dependencies in one or more dependency files, appending to the execution file: a light weight play engine, the one or more dependency files and support information;

closing the execution file;

reading the execution task file having the one or more of nested tasks, wherein the reading comprises:

initializing the execution file by making a local copy of the execution file;

scanning the execution file for security, wherein the scanning includes checking the nested task for task calls to other tasks and backward compatibility; and ascertaining existence of the play engine;

creating a new instance of the execution file, wherein the execution file comprises command line arguments creating the scan and the initialization;

verifying the execution task file having one or more tasks contains proper formatting and with respect to each action, collecting information and adding software to support one or more options that includes one of a scripting language or validation of mainframe supports;

sending dynamically during execution a file of values for each of the variables or arguments associated with each command and passing values for the arguments dynamically at the time of the execution start at the remote location; and checking for the presence of any command line arguments that require the insertion or incorporation of argument values and any errors reading the files;

checking the one or more dependency file errors and outputting errors for each failed dependency;

repeating sending, checking for the presence of any command line arguments and checking the one or more dependency file errors, until an end of file is detected;

closing the execution file.

4. The readable medium as in claim 3, further including code supporting one of TN3270 or TN5250 IBM Mainframe access in Terminal Emulator functionality.

5. A computer system for creating a portable unit on a first computer to be executed on one or more remote computers comprising: a one or more processors, a memory, a communications link and one or more databases containing: an execution file having one or more tasks for deployment, said tasks having command line arguments executable as variables by the remote computer, assembled into a single execution file, said one or more processors configured for: creating an execution file having one or more nested tasks for deployment, said tasks having command line arguments executable as variables by the remote computer, assembled into a single execution file and storing the variables in an array of memory with respective values, said step of creating an execution file having one or more nested tasks for deployment, said tasks having command line arguments executable as variables by the remote computer, assembled into a single execution file and storing the variables in an array of memory with respective values, said step of creating the execution file further including:

starting the inputting of one or more files as key strokes;

converting said keystrokes to a variable; converting to prompt; converting a keystrokes to a prompt message;

defining a new task files and recording of the new task files into the execution file;

validating the recorded new task files for event dependency, wherein validating comprises inserting a tag into the new task files, wherein the tag is automatically recognized as a data type in the file;

stopping the recording of the inputting of one or more files into the execution file;

organizing the new task files into nested tasks, said organizing step including collecting nested task information for each new task file and accounting for presence of all dependencies in the portable unit including files, tasks, and environments for running the execution file on one or more remote computers;

wherein the accounting of all dependencies in the nested tasks includes scanning the execution task file for event dependencies to identify additional files and links needed for remote execution of the execution file and embedding the identified additional files and links into the execution file;

storing the dependencies in one or more dependency files, appending to the execution file: a light weight play engine, the one or more dependency files and support information;

closing the execution file;

reading the execution task file having the one or more of nested tasks, wherein the reading comprises:

initializing the execution file by making a local copy of the execution file;

scanning the execution file for security, wherein the scanning includes checking the nested task for task calls to other tasks and backward compatibility; and ascertaining existence of the play engine;

creating a new instance of the execution file, wherein the execution file comprises command line arguments creating the scan and the initialization;

verifying the execution task file having one or more tasks contains proper formatting and with respect to each action, collecting information and adding software to support one or more options that includes one of a scripting language or validation of mainframe supports;

sending dynamically during execution a file of values for each of the variables or arguments associated with each command and passing values for the arguments dynamically at the time of the execution start at the remote location; and checking for the presence of any command line arguments that require the insertion or incorporation of argument values and any errors reading the files;

checking the one or more dependency file errors and outputting errors for each failed dependency;

repeating sending, checking for the presence of any command line arguments and checking the one or more dependency file errors, until an end of file is detected;

closing the execution file.

6. A computer system as in claim 4, wherein the one or more processors support one of TN3270 or TN5250 IBM Mainframe access in Terminal Emulator functionality.

* * * * *